Jan. 4, 1944.　　　J. O. POLLACK　　　2,338,201
BRAKE
Filed Oct. 16, 1942　　　3 Sheets-Sheet 1

Witness:
V. Siljander

Inventor
Joseph O. Pollack
By Hill & Hill Attys.

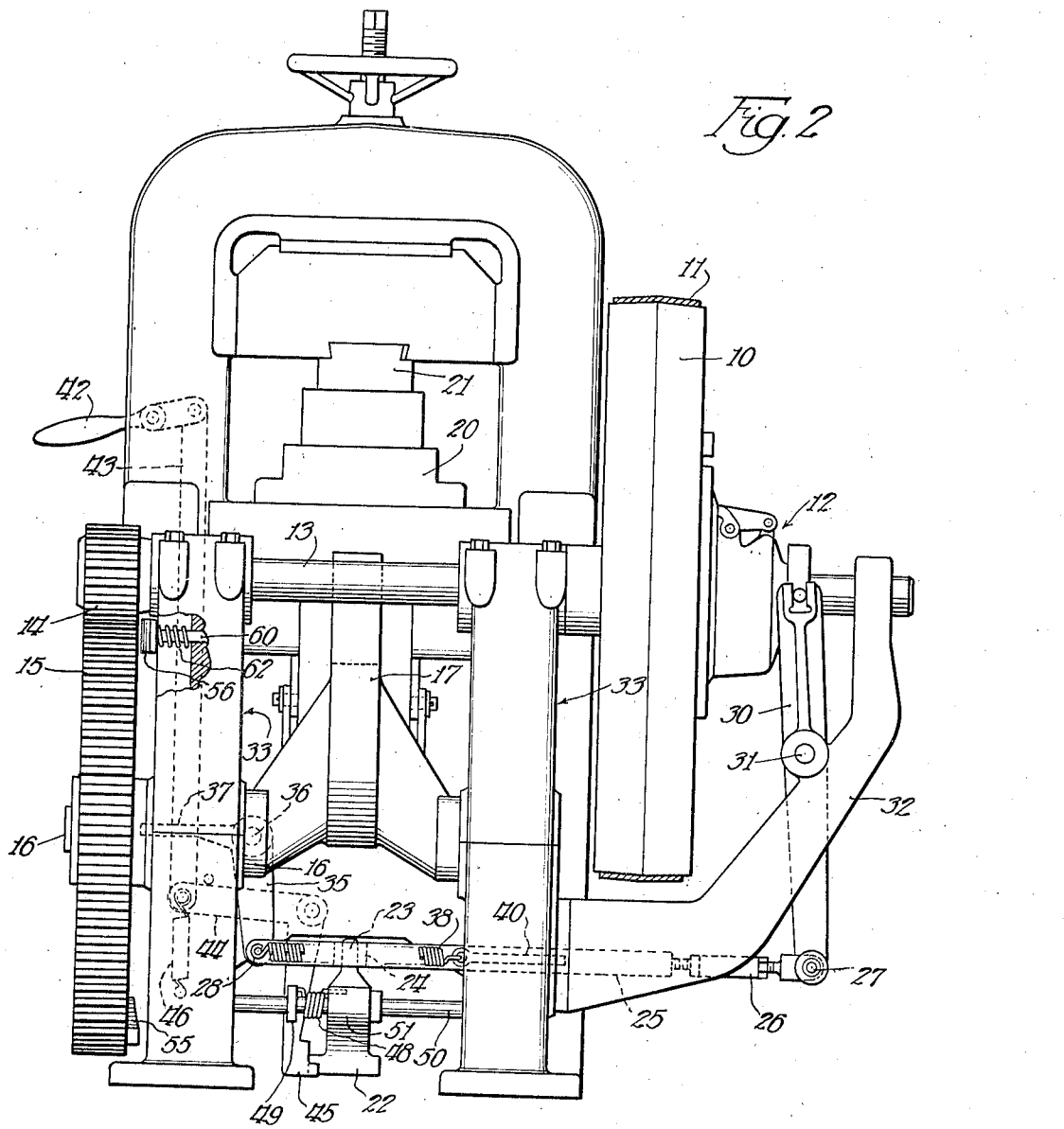

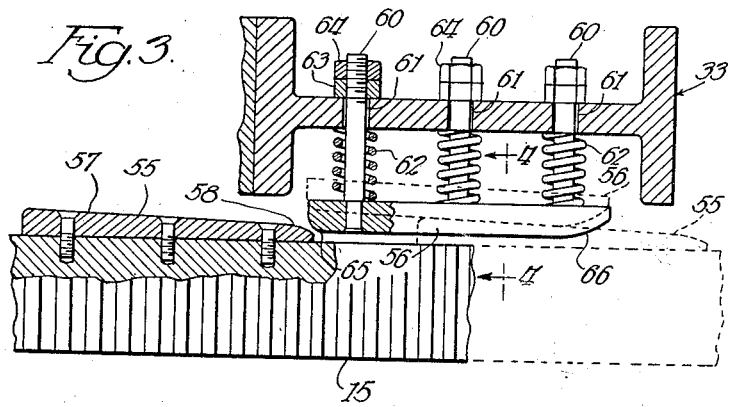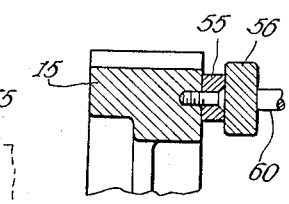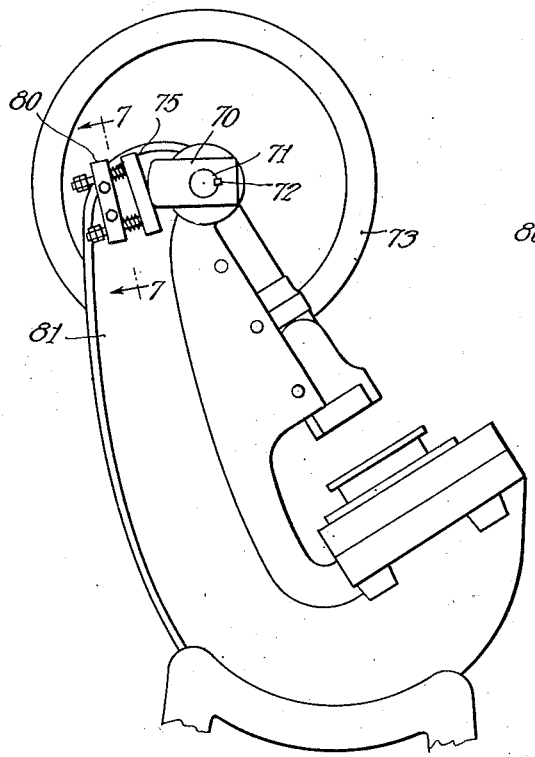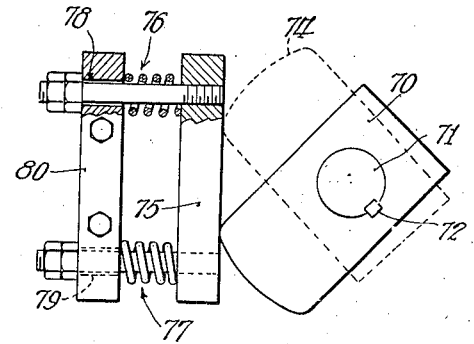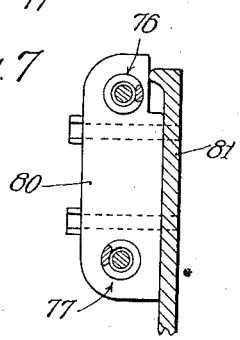

Patented Jan. 4, 1944

2,338,201

UNITED STATES PATENT OFFICE 2,338,201

BRAKE

Joseph O. Pollack, Chicago, Ill.

Application October 16, 1942, Serial No. 462,224

9 Claims. (Cl. 192—144)

The present invention relates to a brake applicable to any machine or relatively movable members of a machine wherein positive stoppage is required at the end of a given cycle of operation of such machine or machine members, or stoppage at any stage in the cycle of operation of said machine or machine members. Good examples of such machines are shearing presses, punch presses, etc., and by way of illustration the brake is shown and described herein as associated with a punch press. The brake broadly consists of two frictional members, one of which is carried by a fixed part of the press or other machine, while the other of said members is carried by a movable part of the press or other machine and said members only become effective to stop the press or said other machine at a definite point in the cycle of operation thereof. In a press, this would normally be when the dies are in full open and in inoperative position, while in another machine such a point might be at a loading or discharging position thereof.

Heretofore, many conventional forms of friction brakes have been employed to stop the movement of press parts that are operating under considerable inertia at the end of each die-forming operation. Such conventional brakes are generally of the type that are continuously operative during the total cycle of operation of the press, and the friction of such brakes must be overcome by the power means driving the press. In other words, such conventional forms of brakes are continually acting upon the moving parts of a press and frequent adjustment thereof and repeated replacements of the various brake lining elements used incurs considerable expense and also causes operating delays. Consequently, since a certain amount of the driving power for overcoming the continuous braking action of such conventional brakes is wasted power, additional operating losses occur while the press is actually running and in good order.

One of the main objects of the present invention is to overcome any waste of power by having the brake so arranged and effective only for a very short interval of time during the cycle of operation of a press or other machine.

Another object of the present invention is to provide a brake which is more or less divided into two coacting parts disposed with one part substantially in the path of the other part and wherein one part is yieldingly supported to provide a definite and positive frictional reaction when contacted by the other part.

The brake also is provided with a plurality of yielding resilient units that can be associated with either one or both of the brake shoes and wherein each yielding resilient unit is effectively brought into action for successively causing a build-up of the frictional contact and reaction between the shoes as the latter pass into active overlapping relationship.

One of the other objects of the present invention is to establish one of the two relatively moving brake members as a means for functioning to engage a trip of the power drive clutch mechanism whereby the power to the moving parts of the press is interrupted immediately prior to the active braking action of the brake members.

Other objects and advantages relating to the particular construction, arrangement and combination of parts of the present invention shall hereinafter be referred to in the following detailed description having reference to certain preferred forms of the present brake.

In the drawings:

Fig. 2 is a rear elevational view of the press illustrated in Fig. 1 to further amplify the relation of the brake of the present invention to the other working parts of the press;

Fig. 3 is a sectional view through a preferred form of brake construction as taken substantially along the line 3—3 in Fig. 1, and wherein the rotatable gear carrying one of the brake shoes is shown as revolved into substantial engagement with the other fixed shoe of the brake;

Fig. 4 is a sectional view taken approximately along the line 4—4 in Fig. 3, but illustrating both shoes in active overlapping contact;

Fig. 5 is a general side elevational view of another conventional form of punch press illustrating a modified adaptation of the present brake;

Fig. 6 is an enlarged detail view of the brake in Fig. 5, and

Fig. 7 is a sectional view taken substantially along the line 7—7 in Fig. 5.

Figure 1:
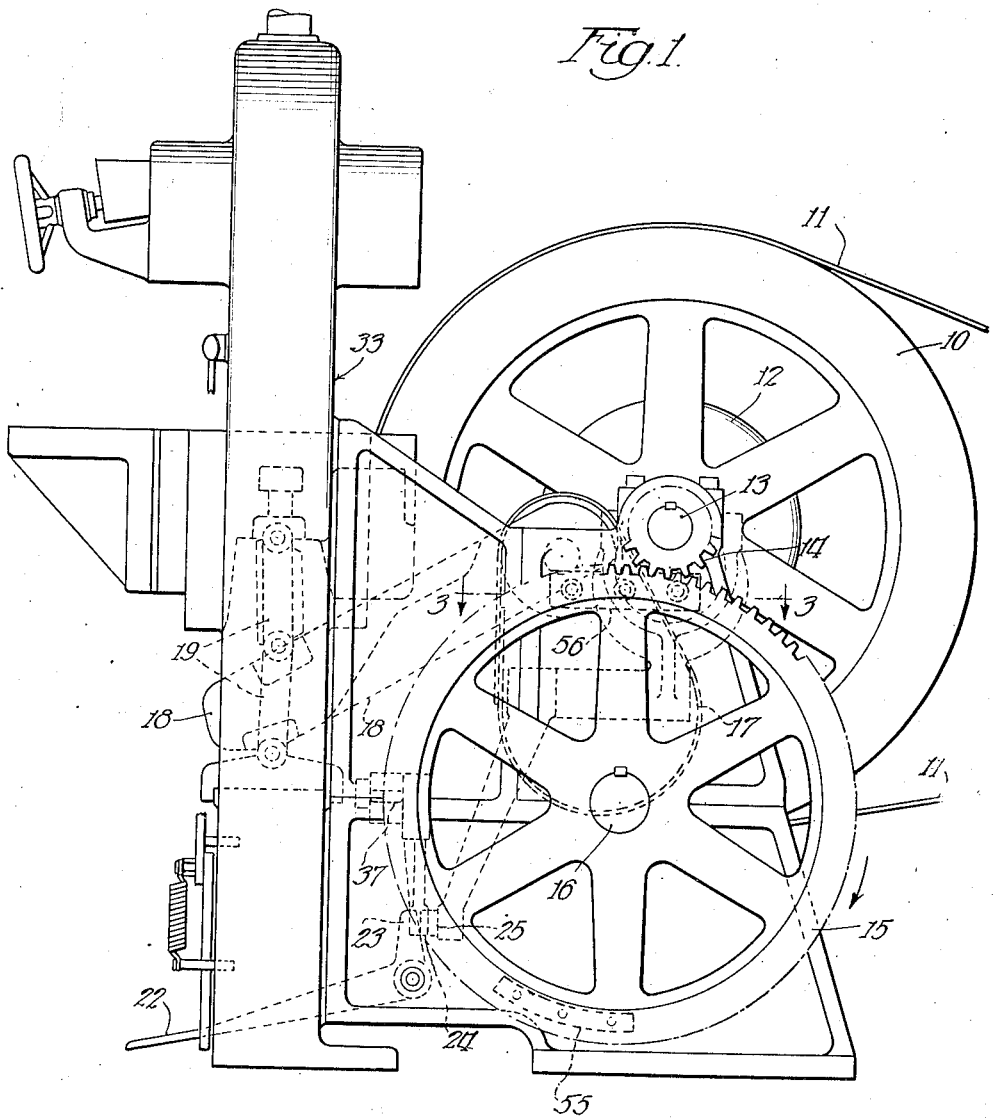
Fig. 1 is a side elevational view of a conventional form of toggle press embodying the brake of the present invention and the related tripping mechanism actuatable by said one of said brake parts.

Since the brake of this invention is applicable to any machine or to relatively moving parts thereof, and, therefore, has many advantageous and desired possibilities, it should be noted that in Figs. 1 to 4, inclusive, the brake is shown as applied to a driven part of a press carried by a driven shaft, while in Figs. 5 to 7, inclusive, the brake is directly associated with the fastest moving part of a press which is the main drive shaft in this case.

Referring now to the conventional form of toggle press illustrated in Figs. 1 and 2, any form of prime mover may be employed for driving the flywheel 10 by means of the belt 11 and a clutch 12 is utilized for transmitting the drive from the flywheel 10 to the shaft 13 and through the gear reduction comprising gears 14 and 15 to the main crankshaft 16 of the toggle press. The crankshaft 16 is adapted for driving a toggle eccentric 17 connected to the toggle arm 18. The movement of the forward end of the toggle arm 18 is adapted for actuating the toggle linkage 19 for raising and lowering the movable die 20 towards and away from the stationary die 21, the dies being best shown in Fig. 2.

To operate the press, the operator steps on the foot treadle 22 which moves the blocking arm 23 out of the path of a lug 24 which is carried on a bar 25. The bar 25 and its associated adjustable means 26 are pivoted at 27 and 28, respectively, the pivot 27 being at one end of the arm 30 pivotally carried at 31 on an arm 32 of the main frame 33 of the press. The other pivotal connection 28 of the bar 25 is carried by one end of a bell crank 35 pivotally supported at 36 on the frame 33 of the machine, said bell crank having the other arm 37 forming suitable trip means for releasing the clutch and for interrupting the power drive to the press. A spring 38 is connected between the pivot 28 and the adjustable stud 40 secured to the frame 33. Spring 38 acts to normally hold the clutch in operative engagement by urging the bar 25 to the right as viewed in Fig. 2. Therefore, by actuating the treadle 22 to release the block 24 from the edge of the blocking arm 23 of the treadle, this will cause the bar 25 to move through the action of spring 38 and towards the right, as viewed in Fig. 2, for causing the clutch 12 to operatively connect the wheel 10 with the shaft 13 in a known manner. The hand-operated safety device comprising suitably connected members 42, 43, 44 and 45 coact through a spring 46 with the treadle 22 as is well known to those skilled in the art. The foot treadle is normally maintained with the blocking arm 23 in operative contacting engagement against the face of the bar 25 or against the face of the block 24 on said bar by means of the coil spring 48, which reacts between a bushing 49 mounted on a fixed shaft 50 and the hub 51 of the treadle.

The press illustrated in Figs. 1 and 2 is shown with the parts moved to that stage of the cycle wherein the dies 20 and 21 are in active contacting and operative engagement and in which position the brake shoes 55 and 56 are widely separated angularly with respect to shaft 16 and in inoperative relation with respect to each other.

Referring now more particularly to Figs. 3 and 4, it is to be noted that the shoe 55 is suitably secured to the rim of the gear 15 and moves directly therewith during the operation of the press. The face of the shoe 55 is tapered as at 57 and the forward leading edge of the shoe is rounded as at 58 for the purpose of passing under the shoe 56.

The latter shoe 56 of the brake is provided with studs 60 fixedly secured thereto and projecting through the openings 61 in one of the side members of the main frame 33. Suitable springs 62 encircle the studs 60 and are interposed between the main frame 33 and the shoe 56 for yieldingly holding said shoe in a definite relation with respect to the path of the movable shoe 55. Each of the studs is provided with the nuts 63 and lock nuts 64 for adjustably positioning the shoe 56 in the most convenient and efficient braking relation with respect to the movable shoe 55.

The shoe 56 is provided with a rounded corner as at 65 for accommodating the rounded leading edge 58 of the moving shoe 55 and the other end of the shoe 56 is provided with a receding edge 66 to cushion or prevent noisy action as the shoe 55 leaves the end 66 of the shoe 56. Not only will the rounded end 66 of the shoe 56 act to cushion the separation of the two shoes, but the same receding curved end 66 of the shoe 56 will also permit the gradual restoration of shoe 56 to its original inactive position as shown in full lines in Fig. 3 as shoe 55 passes out of contact therewith. This prolongs the life of the working parts of the brake by preventing shock and damage to such parts, and particularly to the working parts of the yieldable shoe 56.

During the contact of the shoe, it may be stated that the shoes 55 and 56 will normally stop in a position as indicated in the broken lines in Fig. 3 when in active braking engagement. Furthermore, as the shoe 55 is forced beneath the shoe 56, the various springs 62 of the shoe guiding and cushioning mechanism will successively be actuated as the shoe 55 moves into overlapping engagement with the shoe 56. In this manner, a very effective braking action results, and with the careful adjustment of the nuts 63 and 64, the moving parts of the press may be stopped substantially in the same angular or cyclic relationship for each complete punching operation or cycle of operation.

With the brake of the foregoing construction, the brake shoe 55 has been mounted in such an angular position with respect to the gear 15 and to a stopping point determined by the location of the brake shoe 56 so as to contact and trip the end 37 of the clutch tripping mechanism immediately prior to the active engagement of the shoe 55 with the shoe 56 to stop the momentum and movement of the press parts. In this manner an effective concerted action is obtained wherein the power to the press parts is first interrupted by the actuation of the tripping mechanism through the shoe 55, and subsequently the braking action takes place as the shoe 55 contacts the shoe 56. Obviously, the moving parts are only operating under their own inertia at the time when the two shoes of the press engage and become active to stop the parts.

Another form of the adaptation of the present brake is shown in Figs. 5 to 7 inclusive wherein the moving portion of the brake 70 is keyed to the shaft 71 as at 72, the shaft 71 being the crankshaft of the press having the main driving flywheel 73 secured to the other end thereof. The outer end of the revolving shoe or brake member 70 is preferably concentric as at 74 and is adapted for engaging the spring pressed shoe 75 yieldingly supported and guided by means of the adjustable spring units 76 and 77 suitably supported in the openings 78 and 79 of the bracket 80. The details of the present mechanism is substantially similar to the details of the preferred form of brake illustrated in Fig. 3. The bracket 80 is bolted or otherwise fastened to the side of the frame 81 of the press as best illustrated in Fig. 7.

The relation of the parts of the brake are shown in their braking position in Fig. 5, while the same parts are indicated immediately prior to any braking action in Fig. 6.

From the foregoing description and the disclosure of the drawings, it is evident that the applicant has provided a very efficient form of brake which is only effectively operable for a small interval during the cyclic operation of the press, and the various brake parts particularly the shoes 55 and 56 are made of hardened steel adapted to withstand considerable wear and to furnish a brake wherein the spring parts will stand up under considerable amount of work of the press without showing any effective wear during such operation. Obviously, any wear that may occur over a long period of time can be readily taken up by adjusting the spring members of the stationary shoe. This brake will also save considerable power in view of the fact that most of the cyclic operation of the press will be carried on during the time that said brake shoes are free of each other and ineffective as a brake.

Another advantage of the present brake is the ease and possibility of reversing the action of said brake should opposite rotation of a machine become necessary or desirable. The yieldable shoe 56 of the brake in Fig. 3 may be turned end for end, while the shoe 55 may be reversed and secured by the use of the same stud openings or other stud openings to properly place the shoe 55 in the same angular timing relation with respect to the shoe 56. Obviously, by using the brake shown in Fig. 6, reversal of rotation of the operation of the machine shall have no effect on the brake parts and the latter will function to stop the machine within close limits at substantially the same point in the cycle of operation of said machine whether the latter is rotating in one direction or the other. For very fine stopping positions, slight adjustments may be required in the tensions of the springs and such adjustments can be easily made.

Obviously, various immaterial changes or modifications may be incorporated in the present device for performing the same function and in substantially the same manner as described in connection with the two showings of the forms herein disclosed. The particular construction, arrangement and combination of parts are, therefore, not to be limited to the exact disclosures described excepting insofar as shall be governed by the breadth and scope of the appended claims.

What I claim as new and desire to secure by Letters Patent is:

1. A brake for a machine or the like comprising a first shoe connected for movement with and disposed on one side of a rotatable part of said machine, a second shoe, both of said shoes having relatively long flat friction faces, and means for resiliently supporting said second shoe at a plurality of places along the line of travel of the first shoe, from a fixed part of said machine and laterally of said rotatable part of the machine in a position to be contacted by said first shoe, whereby the motion of said rotatable part of said machine is halted for each revolution thereof.

2. A brake for a punch press having relatively movable dies to be closed and opened for each cyclic operation of the press, comprising a spring pressed shoe carried by the press frame, a second shoe carried by a moving part of said press which part is synchronized with the motion of said relatively movable dies, both of said shoes having relatively long flat friction faces adapted for frictional contact at one point during the cyclic operation of the press, the leading end of one shoe having an inclined edge whereby to depress the other shoe, and means for positioning said spring pressed shoe in the path of said second shoe whereby said shoes coact to stop the motion of said moving part of the press and at a point when said relatively movable dies are apart and in open position.

3. A brake for a press having drive means supported on a frame, comprising a pair of friction shoes both having relatively long flat friction faces adapted to contact at one point during the cyclic operation of said press, one of said shoes being supported for movement directly with one of the active parts of said drive means, the other of said shoes being supported by said frame, and resilient mechanism coacting with one of said shoes to hold the same in the normal path of the other of said shoes, the friction face of said other shoe being tapered to coact with said one shoe to move the same out of its path and to depress said resilient mechanism of said one shoe, whereby said drive means is stopped at the end of each cyclic operation of said press.

4. A brake for a press having drive mechanism supported on a frame, comprising a pair of shoes carried by a moving part of said drive mechanism and said frame respectively, said shoes being positioned for contact at a fixed point in the cycle of operation of said press, one of said shoes having a plurality of resilient members to hold said one shoe in a fixed position with respect to said other shoe, said latter shoe being shaped to have one end thereof initially pass in front of the face of said one shoe and to successively cause each resilient member to increase the frictional contact between said shoes as they overlap, whereby movement between said shoes is stopped and motion of the drive mechanism of said press is halted.

5. In a press having a treadle controlled clutch for connecting the power drive with the die operating mechanism and having trip means for interrupting the drive to said die operating mechanism, the combination of brake shoes for stopping said press with the dies in inoperative and open position, comprising a first shoe connected with a moving part of said die operating mechanism, a second shoe connected with a fixed part of said press, said shoes being positioned for face contact during a limited interval in the cyclic operation of the press and at a time when the dies are open, said moving shoe being adapted for engaging the trip means to interrupt the drive to said die operating mechanism immediately prior to the coaction of said shoes, and resilient means associated with one of said shoes to permit only limited relative movement between said shoes after contact thereof, whereby said press is stopped in said predetermined die open position.

6. In a press having a treadle controlled clutch for connecting the power drive with the die operating mechanism and having trip means for interrupting the drive to said die operating mechanism, the combination of a brake for stopping said press with the dies in inoperative and open position, comprising a first shoe connected with a moving part of said die operating mechanism, a second shoe connected with a fixed part of said press, said shoes being positioned for face contact during a limited interval in the cyclic operation of the press and at a time when the dies are open, said moving shoe being adapted for engaging the trip means to interrupt the drive to said die operating mechanism immediately prior to the coaction of said shoes, and a plurality of resilient members connected with one of said shoes to hold the same in fixed relation to the path of the other of said shoes, said other shoe being shaped to have one end thereof initially pass in front of said one shoe to thereby successively cause each of the resilient members to collectively increase the frictional resistance between said shoes as they overlap, whereby said press is stopped in said predetermined die open position.

7. A brake for a machine having drive means supported on a frame, comprising a pair of friction shoes adapted to contact at one point during the cyclic operation of said machine, one of said shoes being supported for movement directly with one of the active parts of said drive means, the other of said shoes being supported by said frame, and resilient mechanism associated with one of the shoes for positioning the same in the path of the other shoe comprising stop members for limiting the outward movement of the shoe, and springs carried by the stop members to resiliently hold said shoe in said outermost position, whereby relative movement between said shoes is halted when said shoes engage to stop movement of the active machine parts.

8. A brake for a machine comprising a pair of shoes connected with moving and stationary parts of the machine, respectively, one of said shoes being fixed to its connected part and the other of said shoes being supported by yieldable means carried by its connected part, said yieldable means comprising a plurality of guide members for controlling the yieldable movements of said shoe, springs carried by said guide members to hold said shoe in a fixed relation with respect to the other shoe, and stop means connected with said guide members to limit the movement of said shoe beyond said fixed relation.

9. A brake for a press having drive mechanism supported on a frame, comprising a pair of shoes, both having flat friction faces and carried respectively by a moving part of said drive mechanism and said frame, said shoes being positioned for contact at a fixed point in the cyclic operation of the press, one of said shoes having a plurality of studs projecting from the side thereof opposite the friction face and slidably guided in a member of the press, coiled compression springs interposed between said last mentioned shoe and said member of the press, and means cooperating with said springs to position said last mentioned shoe in the path of travel of the other shoe, whereby when the friction faces of said shoes contact movement between said shoes is stopped and motion of the drive mechanism of the press is halted.

JOSEPH O. POLLACK.